United States Patent [19]

Potzick et al.

[11] 4,445,389

[45] May 1, 1984

[54] LONG WAVELENGTH ACOUSTIC FLOWMETER

[75] Inventors: James E. Potzick, Potomac; Baldwin Robertson, Bethesda, both of Md.

[73] Assignee: The United States of America as represented by the Secretary of Commerce, Washington, D.C.

[21] Appl. No.: 300,830

[22] Filed: Sep. 10, 1981

[51] Int. Cl.³ .............................................. G01F 1/66
[52] U.S. Cl. ...................................... 73/861.27; 73/53
[58] Field of Search ...................... 73/53, 597, 861.27, 73/861.28; 374/119

[56] References Cited

U.S. PATENT DOCUMENTS

| | | | |
|---|---|---|---|
| 1,881,543 | 10/1932 | Hartig et al. | 73/861.27 |
| 2,515,221 | 7/1950 | Henning | 73/861.27 X |
| 2,758,663 | 8/1956 | Snavely | 73/597 |
| 2,949,773 | 8/1960 | Batchelder | 73/861.27 X |
| 3,007,339 | 11/1961 | Hill | 73/861.28 |
| 3,145,564 | 8/1964 | Poole et al. | 73/861.27 |
| 4,003,252 | 1/1977 | Dewath | 73/861.27 |

OTHER PUBLICATIONS

Pedersen et al.-NBS Pub. 484 of Proceedings of the Symposium on Flow in Open Channels and Closed Conduits, Oct. 1977, pp. 293-318.

Primary Examiner—Charles A. Ruehl
Attorney, Agent, or Firm—Eugene J. Pawlikowski; Alvin J. Englert

[57] ABSTRACT

A nonintrusive instrument for measuring the volume flowrate of, and the speed of sound in, an arbitrary fluid in a pipe, tube or duct. The sound speed measured is that of a stationary fluid even though the measurement is made while the fluid may be flowing. These measurements are absolute in that they require no flow calibration, and they are independent of the composition of the fluid and its temperature. For a flowing, approximately perfect gas or gas mixture, given the average molecular weight and ratio of specific heats, the instrument measures the temperature. Also, given an independent measurement of the pressure, it measures the gas density and mass flowrate. The measurement can be made in a high noise level environment even when the temperature varies rapidly over a large range. The instrument uses sound whose wavelength is much longer than the diameter of the pipe, tube or duct. As a result, the temperature and flow measurements are independent of the profiles of those quantities across the pipe profiles.

22 Claims, 7 Drawing Figures

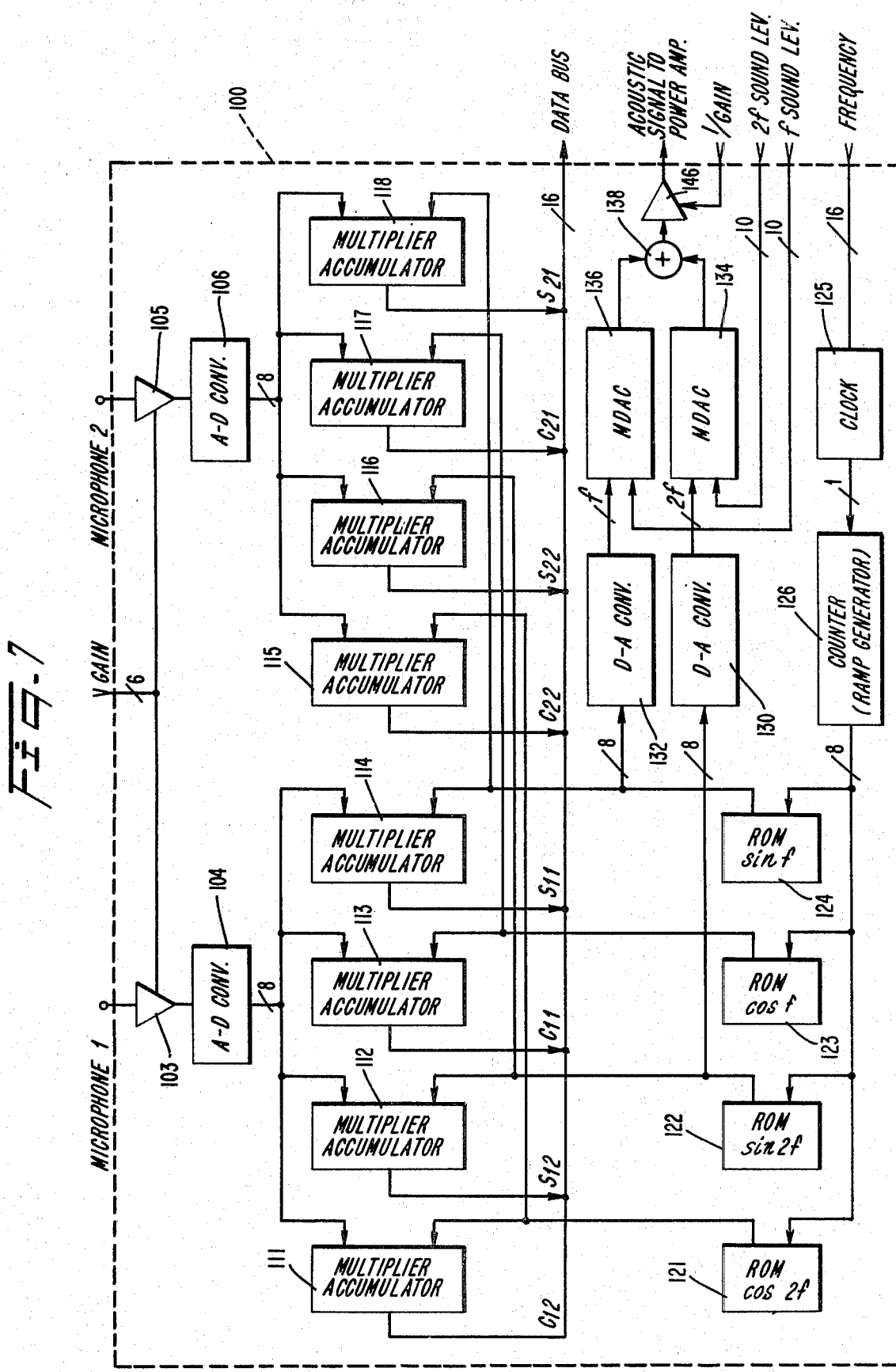

LONG WAVELENGTH ACOUSTIC FLOWMETER

BACKGROUND OF THE INVENTION

The present invention relates generally to flowmeters for measuring volume flowrate in flowing fluids and to instruments for measuring the mass flowrate, temperature and density of flowing fluids. It relates specifically to methods of and instruments for using acoustical techniques for accomplishing these measurements in a pipe.

The increased interest in reducing automotive emission of atmospheric pollutants has given rise to a need for a flowmeter to measure the volume flowrate of exhaust flow from the tailpipe. This flowmeter can be used with pollution concentration detectors to obtain the total pollutant mass flowrate from a tailpipe on automotive production lines and in state and local test stations to determine compliance with Environmental Protection Agency (EPA) regulations. Additional applications for such a flowmeter include the measurement of engine intake or exhaust flowrates and temperatures for the development of fuel-efficient engines of either the reciprocating or turbojet kind. Still further applications include measuring the flow of natural gas or steam in a pipe or the flow of human or animal breath.

A requirement for an automotive exhaust flowmeter is that it be nonintrusive to the extent that it introduce a backpressure less than 500 pascals (Pa). (1 Pa=1 Newton/square meter, 1 standard atmosphere=101,325 Pa.) Also, the exhaust temperature can vary rapidly over a large range up to 260° Celsius, and the wide-band noise level in the tailpipe may be as high as 145 db. It is desirable to be able to respond to changes in the flow rate very quickly (within a few milliseconds).

Prior art nonintrusive ultrasonic flowmeters are described in a paper by L. C. Lynnworth entitled "Ultrasonic Flowmeters" published in "Physical Acoustics" (Academic Press, 1979, Vol. 14, pp. 407-525) which contains a comprehensive list of references. The only acoustic flowmeters that have a chance of working properly in the presence of high levels of broadband noise use substantially continuous waves and narrowband or high-Q transducers and/or subsequent electronic filters. Typical flowmeters of this kind are disclosed in U.S. Pat. No. 4,003,252 to Dewath; U.S. Pat. No. 4,011,755 to Pederson, et al.; and U.S. Pat. No. 4,164,865 to Hall, et al. All of the prior art acoustic flowmeters use waves whose wavelength is shorter than the cutoff wavelength of the conduit which is defined for a circular pipe as 1.706 times the pipe diameter, and for other conduits as $2\pi$ times the square root of the next to lowest eigenvalue for the Helmholtz equation in that geometry.

For such short wavelengths, spatial acoustic modes of higher order than the fundamental will propagate in the pipe along with the fundamental mode. These higher modes will be unavoidably generated by reflection of the sound by bends, elbows, and other obstructions that occur in all pipe systems. If these modes are permitted to propagate into the region where the flow measurement is carried out, their superposition with the fundamental mode will be detected there as a single sound wave that is sinusoidal in time. The phase of this wave will depend on the phases and amplitude of all of the modes in the sum (the higher order modes as well as the fundamental one). Unavoidable temperature variations in the flowing gas will cause these phases and amplitudes to vary in an extremely complicated way. Thus, the detected phase difference cannot be related to the flowrate without using a detailed knowledge of the time dependence of the temperature distribution. This dependence is not available; and, even if it were, the relation would be impractically difficult. As a result, the flowrate indication will drift unpredictably when the temperature of the gas is not constant.

In an effort to prevent the higher spatial modes from interfering with the flow measurement, prior art continuous-wave flowmeters use sound absorbing material in the transducer assembly, e.g., those disclosed in Dewath and Hall, et al., previously noted. Available materials may be expected to reduce the reflected wave amplitude by at most a factor of ten or so from the incident amplitude. The result will be an offset in the flow indication that varies unpredictably even with the small temperature changes that are typical in an instrument in an air conditioned room. This will limit the accuracy of the flow measurement even more in less demanding applications. The situation is much worse for the intended applications where the temperature excursions are much larger and the effectiveness of the sound absorber may be destroyed. Therefore, no prior art instrument is capable of performing the required gas flow measurements in a pipe.

Another desirable characteristic of a flowmeter is that it gives a flow indication that is independent of flow profile. U.S. Pat. No. 4,078,428 to Baker, et al., discloses a flowmeter that is intended to give a total mass flow indication that is independent of whether the profile is laminar or turbulent. However, the method used depends on the flow being fully developed and the profile having a particular mathematical form. Hence, this prior art flowmeter is not accurate for nonaxisymmetric flows that may occur, e.g., resulting from bends, elbows, or valves upstream.

Additionally, there is a need in the petroleum and chemical process industries for measuring flowrates and relative fractions in flowing liquid-liquid mixtures, liquid-gas mixtures, particle-liquid mixtures or slurries, and particle-gas mixtures. An example of a prior art instrument intended for the first of these applications is disclosed in U.S. Pat. No. 4,080,837 to Alexander, et al. This prior art instrument is intended to measure water content in an oil-water mixture and determine the flowrate. To reduce droplet size, it uses a mixer consisting of a plurality of tortuous flow routes, which cause a substantial pressure drop. Without the mixer, the droplets would be so large that the ultrasonic beam used in the prior art instrument would not be able to get across the pipe and the instrument would not operate at all. This difficulty exists with all short wavelength prior art acoustic flowmeters used on any multiphase or multicomponent flow.

SUMMARY OF THE INVENTION

It is, therefore, an object of the present invention to provide an instrument capable of accurately mesuring the average flow velocity or volume flowrate of an arbitrary fluid, e.g., a gas, a liquid or a multiphase or multicomponent fluid, flowing in a conduit, the average being taken over the interior of the conduit pipe.

It is a further object of the present invention to accurately measure the average speed of sound in an arbitrary flowing fluid, the sound speed being that of the same fluid as if it were stationary.

It is a still further object of the present invention to generate sound in an arbitrary fluid of a specified wavelength, even though the speed of sound in the fluid is varying rapidly in space and time.

It is a further object of the present invention to accurately measure the total mass flowrate, average density, and average temperature of a flowing, approximately perfect gas or gas mixture, given the average specific heat ratio, the pressure, and the average molecular weight.

It is an additional object of the present invention to provide an absolute measurement of mass flowrate, average density and average temperature of a flowing gas, i.e., without requiring calibration.

It is a further object of the present invention to provide an accurate measurement of all these quantities, independent of the flow, sound speed, and temperature distributions or profiles across the conduit.

It is still a further object of the present invention to nonintrusively measure all of the above quantities, i.e., the instrument has no protuberances or cavities that disturb the flow.

It is an additional object of the present invention to accurately measure the above quantities in a relatively high noise environment.

It is a further object of the present invention to provide a bidirectional flow measurement, i.e., giving a signed flow indication.

The above and other objects are achieved by using a long wavelength acoustic technique where the wavelength is longer than the cutoff wavelength of the conduit. A loudspeaker or other sound source is connected to a conduit through which the fluid to be measured is flowing. Displaced from the loudspeaker some distance away, two small broadband microphones or pressure transducers are mounted in the wall of the same pipe, tube or duct. These may be mounted with their diaphragms flush with the inner wall surface so that the surface presented to the flowing fluid is smooth and without protuberances or cavities. One microphone is placed further from the loudspeaker than the other a distance which, in the case of a circular conduit, may be six pipe diameters or more. For a noncircular conduit, comparable spacing is used. This spacing can be varied by using a telescoping pipe, tube or duct. In any event, the spacing chosen is an integral multiple of one-half the wavelength of the sound to be generated.

In a preferred embodiment, the loudspeaker generates sound that is the superposition of sine waves at two frequencies, one twice the other, such that the wavelength of the higher frequency component equals the distance between the microphones. The instrument accomplishes this by measuring the sound amplitude at each microphone and for each frequency, computing the ratio of amplitudes from the two microphones for each frequency, and subtracting the ratio at one frequency from the ratio at another to obtain an error signal. The error will vanish when the shorter wavelength equals the distance between the microphones. The error is integrated, and the integral is used to set the frequency of an oscillator that, along with a frequency divider, generates the two frequencies used to drive the loudspeaker. Once the frequencies are set correctly, the instrument measures the difference in phase of the signal detected by each microphone at each frequency. The phase differences and the frequency are used to obtain the above described quantities.

BRIEF DESCRIPTION OF THE DRAWINGS

A more complete appreciation of the invention and the attendant advantages thereof will be more clearly understood by reference to the following drawings wherein:

FIG. 3 is an electrical block diagram of the synchronous phase marker and amplitude detector (SPMAD);

FIG. 7 is a detailed block diagram of the parallel processor used in a digital embodiment of the present invention.

DETAILED DESCRIPTION

In order to overcome the problems noted with regard to the prior art's using of short wavelengths, it has been found that a wavelength much longer than the cutoff wavelength of the conduit is helpful. For such wavelengths, only one mode will propagate, the fundamental or plane-wave mode. In an instrument that uses only these longer wavelengths, there is no possibility of higher modes causing errors. The instrument will indicate the total flowrate and the gas temperature averaged over the interior of the meter tube. The accuracy of the measurements will be independent of the flow and temperature profiles in the pipe and hence independent of upstream piping configurations.

The present invention shows a substantial advantage when there are droplets or particles in the fluid. Since the wavelength is very large compared with the size of the droplets or particles, scattering does not prevent the sound from getting through, and the instrument will operate without using a mixer, which would cause a large pressure drop. As with single-phase flow, the present invention will measure the average volume flowrate of the composite fluid and the average speed of sound in it. These measurements can be interpreted semiempirically, based on prior calibration with the particular mixture of interest, in order to obtain the desired quantities, such as mass flowrate and relative fraction, without introducing a pressure drop.

Figure 1:
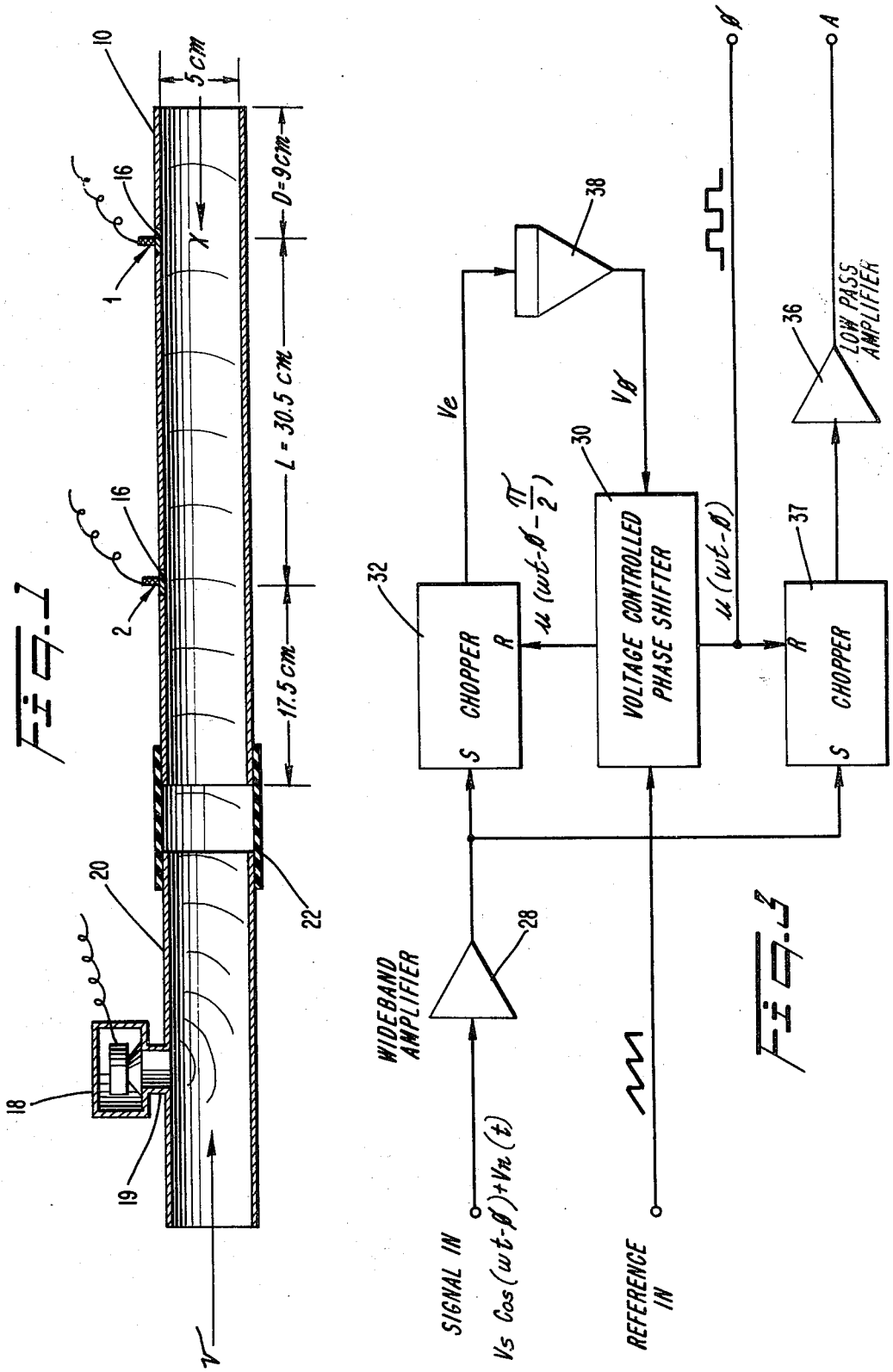
FIG. 1 is a longitudinal sectional view of an open-ended embodiment of the meter-tube assembly used in the present invention.

Referring now to the drawings wherein like reference characters designate like parts throughout the several views, FIG. 1 shows the meter tube 10 of a preferred embodiment having first and second receiving means comprising microphones 1 and 2 mounted in the wall, preferably with their diaphragms flush with the inner surface of the wall. To insulate the microphones from vibrations passing along the tube itself, the microphones may be mounted in an elastic material 16. The tube may be made of 3 mm thick brass with an inner diameter of 5 cm, and the microphones are spaced 30.5 cm apart. The terms tube, pipe, duct and conduit are used herein to indicate any means for conveying a fluid flow regardless of cross-section. A means for producing acoustic waves comprises a loudspeaker 18 directly coupled to a branch 19 of the tube 20 at a location 50 cm upstream of the upstream microphone. In order to prevent the brass wall of the tube 20 itself from transmitting sound directly to the microphones, a rubber vibration isolation coupling 22 may be used to connect the meter tube 10 to the tube 20 on which the loudspeaker is mounted.

The loudspeaker generates sound consisting of a superposition of two sinusoidal waves at frequencies f and 2f. The frequency is chosen so that 2f is substantially less than the cutoff frequency of sound in the meter tube. When the waves reach the microphones, the cutoff spatial modes will have decayed nearly to zero and only the fundamental waves in the form of plane waves will be present. In the embodiment of FIG. 1, the downstream traveling waves are reflected from the open end of the meter tube 10 with a small decrease in amplitude. The downstream microphone may be spaced 9 cm from the open end of the meter tube 10 so that the sound amplitude at each frequency is satisfactorily large at each microphone, at least when the wavelengths are nearly correct.

In another similar embodiment to be used in a closed piping system, the downstream traveling waves will be reflected by the bends and elbows that always occur in closed piping systems. In this embodiment, the locations of the microphones are chosen so that the sound will have a satisfactorily large amplitude at the microphones. This can always be done since, if the sound waves are not large enough at one pair of locations, they will be large enough if the locations are translated upstream or downstream some distance less than one-quarter wavelength. For either embodiment, the region between the microphones will contain plane waves traveling in both directions such that the microphones are not near nodes for either frequency.

The flowing fluid affects the sound velocity so that the average propagation velocity c of the sound is decreased in the upstream direction and increased in the downstream direction in the amount of the average velocity v of the fluid. The averaging occurs because the sound wavelength is long compared with the diameter of the tube. We are not able at present to described the precise character of the averaging except for a single-phase fluid. Still, it is certainly quite apparent that the long wavelength technique can measure averages taken over the entire meter tube between the two microphones.

To simplify exposition, we describe only the effects associated with the components at a single angular frequency $\omega$, which later in our discussion can be chosen to equal either $2\pi f$ or $4\pi f$. Thus, for the present, the acoustic pressure field can be considered to comprise two terms, one for the upstream traveling wave and one for the downstream wave. The propagation velocities in these terms equal the average sound speed c decreased or increased, respectively, by the average fluid velocity v. The voltage from a wideband microphone is proportional to the acoustic pressure, and hence is given by:

$$V = A_u \cos\left(\omega t - \frac{\omega x}{c - v} + \phi_u\right) + A_d \cos\left(\omega t + \frac{\omega x}{c + v} + \phi_d\right) \quad (1)$$

where $A_u$ and $A_d$ are the voltage amplitudes due to the upstream and downstream traveling waves, $\phi_u$ and $\phi_d$ are the corresponding phases, and x is the position of the microphone, with x increasing in the upstream direction.

Consider the open-ended embodiment of FIG. 1. Let the end of the pipe be at $x=0$. Now the effective end of the pipe is located a small distance l (the end correction) outside the end of the pipe. Thus, the downstream traveling wave is reflected at $x=-l$. After reflection, it becomes:

$$A_u \cos\left(\omega t + \frac{\omega l}{c - v} + \phi_u\right) = -RA_d \cos\left(\omega t - \frac{\omega l}{c + v} + \phi_d\right) \quad (2)$$

where R is the magnitude of the reflection coefficient, which satisfies $0 < R < 1$. Both R and the end correction $kl = \omega l/c$ are determinable in the literature for both flanged and unflanged circular pipes. The absolute phase, which has no physical significance, can be specified by choosing the time origin so that $\phi_u + \phi_d = 0$. If we let $A_d = A > 0$, the last equation gives $A_u = -RA$ and:

$$\phi_d = -\phi_u = \frac{\omega c l}{c^2 - v^2} \quad (3)$$

The same formulas can be used for the embodiment intended for a closed piping system. Here R and l effectively parameterize the amplitude and phase at the meter tube of the plane wave that results from sound reflection by bends and elbows downstream of the meter tube.

With these results, trigonometric identities can be used to reduce the expression for the microphone signal to:

$$V = A(x) \cos[\omega t + \phi(x)] \quad (4)$$

where the amplitude is:

$$A(x) = A\sqrt{1 - 2R \cos\left(2\omega c \frac{x + l}{c^2 - v^2}\right) + R^2} \quad (5)$$

and the phase is $$\phi(x) = \tan^{-1}\left[\frac{R + 1}{R - 1} \tan\left(\omega c \frac{x + l}{c^2 - v^2}\right)\right] - \frac{\omega v x}{c^2 - v^2} \quad (6)$$

Thus, the signal from a microphone is sinusoidal with an amplitude and phase that depends among other things on the average wavelength $2\pi c/\omega$ and on the average velocity v.

For the above, we have not considered the frequency dependence of the coefficient $A_d$. Resonances in the piping system and the loudspeaker will cause $A_d$ to depend strongly on frequency. However, the ratio of amplitudes at the two microphones will be independent of actual amplitude and will have a smooth frequency dependence. If one microphone is at $x = D$ and the other at $x=D+L$, then the ratio of the amplitude of the downstream microphone to that of the upstream one is:

$$\frac{A(D)}{A(D+L)} = \sqrt{\frac{1 - 2R\cos\left(2\omega c \frac{D+l}{c^2-v^2}\right) + R^2}{1 - 2R\cos\left(2\omega c \frac{D+L+l}{c^2-v^2}\right) + R^2}} \quad (7)$$

A portion of the instrument, which is a means for insuring that spacing L is an intergral multiple of one-half the specified wavelength, computes this ratio or its square and uses it to adjust the operating frequency F. When the frequency is set to the correct operating point, the average flow velocity and average flowrate are proportional to the phase difference.

The operating frequency may be set by requiring the ratio be equal to 1, which occurs when the frequency satisfies:

$$f = \frac{c^2 - v^2}{2Lc} \quad (8)$$

with either $\omega=2\pi f$ or $\omega=4\pi f$. This makes the argument of the cosine in the denominator larger than the argument in the numerator by $2\pi$ or $4\pi$, respectively, so that the ratio is 1 in both cases. A better method used in a preferred embodiment involves sound of the two frequencies, f and 2f, superposed, i.e., generated together by the loudspeaker. Here, the fundamental frequency f is obtained by dividing the frequency 2f digitally by 2. The instrument adjusts these frequencies to make the amplitude ratios at the two frequencies merely equal to each other rather than both equal to 1. This eliminates any error in setting the operating frequency due to changes in the sensitivity of either microphone or either microphone amplifier.

If the first subscript 1 or 2 denotes the downstream microphone 1 or upstream microphone 2, respectively in FIG. 1, and the second subscript 1 or 2 denotes the frequencies 1f or 2f, respectively, the error signal used in the analog emboidment to be described is the difference of ratios:

$$\epsilon = \frac{A_{12}}{A_{22}} - \frac{A_{11}}{A_{21}} \quad (9)$$

This can be computed from equation (7) by using $\omega=2\pi f$ for the first ratio and $\omega=4\pi f$ for the second. In the digital embodiment to be described, the error signal is the difference in the squares of the ratios (in equation (7)) for the two frequencies. This difference equals the sum of the ratios (in equation (7)) for the two frequencies, multiplied by the difference (in equation (9)). Since the sum of ratios is approximately equal to 2, the two error signals are nearly proportional to each other. In either embodiment, if one microphone or amplifier sensitivity changes, then both numerators or both denominators will change by the same factor, and the error signal will still be zero at the correct operating frequency.

Figure 2:
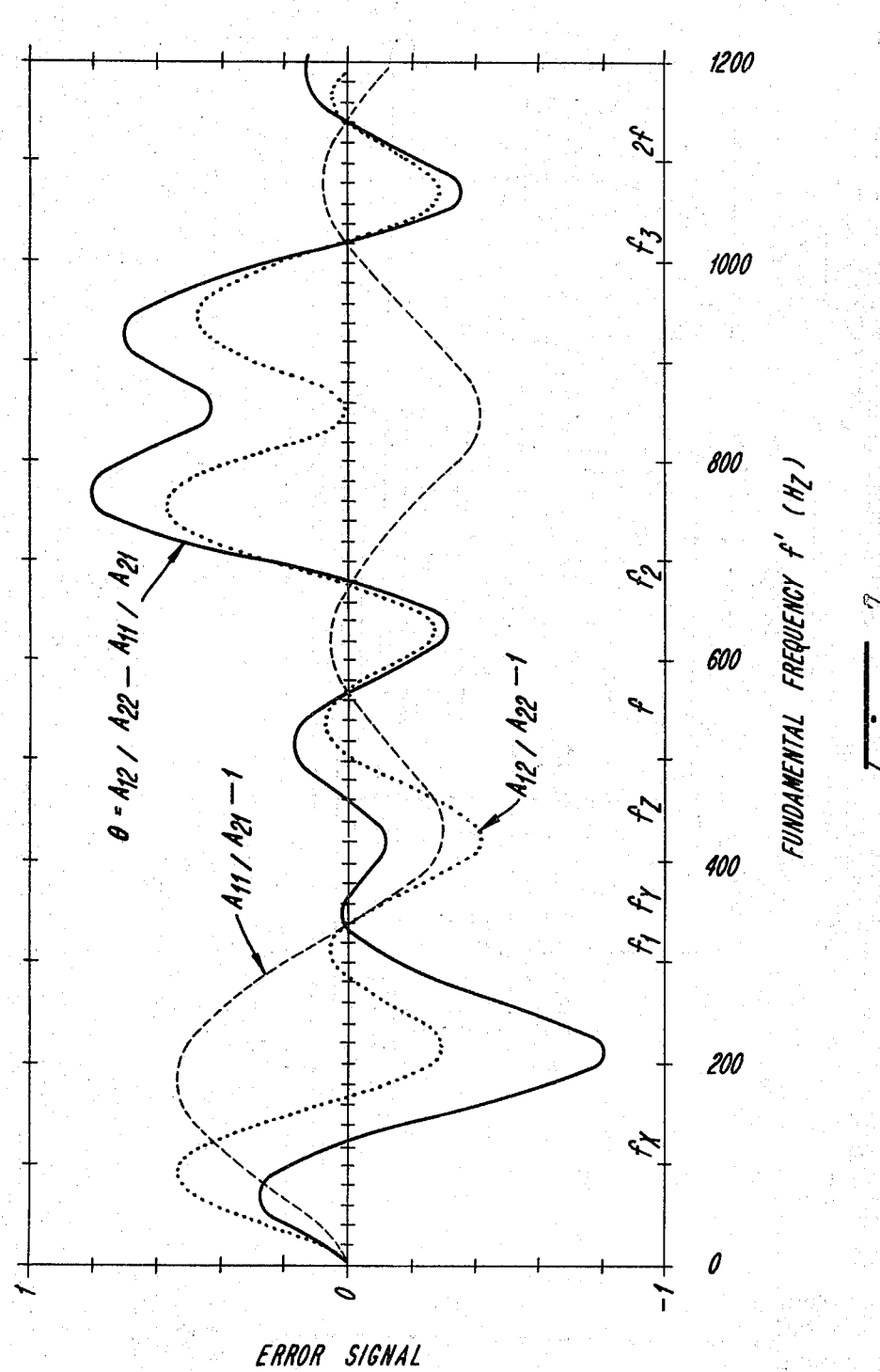
FIG. 2 is a graph showing three possible error signals versus frequency.

The error signal of equation (9) is graphed in FIG. 2 (solid line) as a function of the fundamental frequency f' generated by the loudspeaker. Also shown in FIG. 2 are graphs of the ratio in equation (7) minus one for frequency f' (dashed line) and frequency 2f' (dotted line), both as a function of the fundamental frequency f'. The correct operating frequency is the frequency labeled f at which all three curves cross zero. Other frequencies at which all three cross zero are labeled $f_1$, $f_2$ and $f_3$. By using equation (8) to eliminate $c^2-v^2$ from equation (7), one can show that these frequencies are given by:

$$f_1, \frac{f_2}{2}, \frac{f_3}{3} = \frac{Lf}{2D+L+2l} \quad (10)$$

These equations should be used with some caution, since the end correction l depends on f', i.e., on $f_1$, $f_2$ and $f_3$, in the three equations, respectively. Thus, the three frequencies are not exactly in the ratio 1, 2, 3, although they are very nearly so, since 2l is small compared with 2D+L. Still, other frequencies at which equation (9) crosses zero are labeled $f_X$, $f_Y$ and $f_Z$. These zero crossings occur because the two ratios in equation (9) are equal to each other, even though they are not equal to 1. Elimination of $c^2-v^2$ in equation (7) by use of equation (8) shows that $f_x=Xf$, $f_y=Yf$ and $f_z=Zf$, where the coefficients X, Y and Z are transcendental functions of R and (D+l)/L evaluated at the frequency involved.

The error signal $\epsilon$ crosses zero once in the interval $f_z<f'<f_2$. Thus, provided f' starts in this range, integral feedback can easily be used to set f'=f. In the analog embodiment of FIG. 4, the time integral of the error $\epsilon$ is fed to the voltage input of a voltage-controlled oscillator. In the digital embodiment of FIG. 7, the error $\epsilon$ is added by software to the BCD frequency input of a digitally controlled oscillator. For both embodiments, the result is that, if $f_z<f'<f$, then f' wil increase until it equals, f, and, if $f<f'<f_2$, then f' will decrease until it equals f.

For the embodiment of FIG. 1 in which the distance L between microphones is fixed at 30.5 cm, the zero-velocity operating requency f given by equation (8) for dry air will be 544 Hz at 0° C., 563 Hz at 20° C. and 660 Hz at 130° C.

Thus, when the flowmeter is operating correctly, the tone can be heard to increase steadily as the temperature of the flowing gas is raised. For the 563 Hz operating frequency that is correct for 20° C., the lower frequency $f_z$ is 462 Hz, and the upper frequency $f_2$ given by equation (10) is 666 Hz, since l=1.55 cm at that frequency.

Since the operating frequency f changes with temperature, the range within which f' should be constrained for integral feedback to work must be somewhat smaller than the interval from 462 to 667 Hz. This is necessary because, when f changes with changing temperature, so also do $f_z$ and $f_2$. The frequency limits must be fixed narrowly enough for the feedback to work for both extremes of the possible values of f. Since $f/f_z=1.219$ and $f_2/f=1.185$, the ratio of upper and lower frequency limits should not exceed 1.185, which is the smaller of the two ratios. For example, integral feedback will work with the frequency f' restricted to the interval from 558 Hz to 661 Hz, which corresponds to the temperature range from 15° C. to 130° C. Of course, other frequency ranges with the ratio 1.185 are possible with integral feedback. They can be made switch-selectable, and the user can choose the appropriate one based on prior experience or on an independent temperature measurement. The choice can also be made by a microcomputer that is suitably programmed to do this or, alternatively, to examine $A_{11}/A_{21} - 1$ as well as $\epsilon$ to find the correct operating point.

The range of frequencies f' over which the instrument will atuomatically seek the correct operating frequency f can easily be extended by the following technique. If the frequency f' is just less than $f_z$, the previously described integral feedback will cause f' to decrease quickly toward $f_y$, and similarly, if f' is just greater than $f_2$, it will quickly increase toward $f_3$. When f' reaches the new, more widely spaced frequency bounds on its way to $f_y$ or $f_3$, the instrument, in a preferred embodiment, will cause it to jump into a smaller range from which the integral feedback will bring it quickly to the correct operating frequency f.

Further explanation of this feedback technique requires considering numerical values for the frequencies involved. Since $f/f_y = 563/364 = 1.547$ and $f_3/f = 1015/563 = 1.803$, the new ratio of upper and lower frequencies should be 1.547 (1.547 being the smaller ratio). With this ratio, the frequency range could be enlarged, e.g., to the interval from 551 to 849 Hz, corresponding to the temperature range from 7° to 392° C. For this temperature range, the frequency f' should be constrained to the interval from 550 to 850 Hz and caused to hop to 698 Hz when it reaches 550 Hz and hop to 651 Hz when it reaches 850 Hz.

The choice of these numbers can be understood by examining the action of feedback at the temperature limits. For the upper temperature limit of 392° C. for which f=849 Hz, integral feedback causes f' to increase to 849 Hz whenever f' is initially greater than $(f_z/f) \times 849$ Hz $= 849 \times 462/563$ Hz $= 697$ Hz. When f' is less than 697 Hz, it quickly decreases to 550 Hz, at which point the instrument causes it to hop to 698 Hz, and integral feedback takes it from there to 849 Hz. For the lower temperature limit of 7° C, for which f=551 Hz, integral feedback causes f' to decrease to 551 Hz whenever f' is initially less than $(f_z/f) \times 550$ Hz $= 1.185 = 550$ Hz $= 652$ Hz. When f' is greater than 652 Hz, it quickly increases to 850 Hz, at which point the instrument causes it to hop to 651 Hz, and integral feedback takes it from there to 551 Hz. In practice, the useful temperature range will be slightly smaller than 7° to 392° C. in order to prevent the frequency f' from hopping when noise causes it to fluctuate slightly from the operating point f. Of course, the instrument could be designed to operate over other temperature ranges by modifying the above numbers appropriately.

When the frequency $\omega/2\pi$ is a multiple of equation (8), the integral multiples of the wavelength will be equal to twice the microphone spacing. This condition is maintained regardless of flow velocity, temperature, speed of sound, etc. The ability to generate a specified wavelength sound regardless of physical changes in the surrounding is extremely useful.

Additionally, when the frequency $\omega/2\pi$ is a multiple of equation (8), the phase difference between the two microphone signals becomes:

$$\Delta \phi = \phi(D) - \phi(D+L) = \frac{\omega v L}{c^2 - v^2} \quad (11)$$

This is independent of the parameters R and D+l. The ratio of equation (7) is also independent of these parameters when $\omega/2\pi$ is a multiple of the frequency of equation (8), since then the ratio equals 1. This means that sound-reflecting objects outside the end of the tube within a few centimeters of its end will not change the phase differences and amplitude ratios at the operating frequency. This has been used to verify experimentally that the instrument is operating at the correct frequency. When it is, the performance of the instrument is not affected by the presence of objects near the open end of the tube.

Equation (11) is the basis for the flow measurement. This equation can be simplified using equation (8) so that, with $\Delta t = \Delta \phi/\omega$ the average Mach number $M = v/c$ is given by:

$$M = 2f \Delta t \quad (12)$$

which simplifies to $\Delta \phi/\pi$ for $\omega = 2\pi f$ and simplifies to $\Delta \phi/2\pi$ for $\omega = 290$ 2f. Thus, as long as equation (8) is satisfied, the average Mach number is just the phase difference in units or $\pi$ for frequency f and in units of $2\pi$ for frequency 2f. Also, the condition of equation (8) gives an expression for the average speed of sound:

$$c = \frac{2fL}{1 - 4f^2 \Delta t^2} \quad (13)$$

Equation (12) can be combined with equation (13) to obtain n expression for the average velocity v as follows:

$$v = \frac{4f^2 L \Delta t}{1 - 4f^2 \Delta t^2} \quad (14)$$

When this is multiplied by the cross-sectional area a, it becomes the average volume flowrate Q=av. Thus, the speed of sound, the average velocity, and the average volume flowrate are given in terms of just the operating frequency f, the time difference $\Delta t$ or equivalently the phase difference $\Delta \phi$, the distance L between the microphones and the cross-sectional area a, which can be easily measured very accurately. These results are valid for an arbitrary fluid, i.e., a gas, a liquid, or a multiphase or multicomponent fluid.

If the fluid is restricted to be an approximately perfect gas or gas mixture, the gas density $\rho$ satisfies:

$$\rho = \gamma P/c^2 = \gamma P \left[ \frac{1 - 4f^2 \Delta t^2}{2fL} \right]^2 \quad (15)$$

where $\gamma$ is the average ratio of specific heats of the gas, and P is the absolute pressure inside the meter tube. Also, the temperature T of the gas is given by:

$$T = \frac{mc^2}{\gamma K} = \frac{m}{\gamma K} \left[ \frac{2fL}{1 - 4f^2 \Delta t^2} \right]^2 \quad (16)$$

where m is the average mass of a gas molecule and K is Boltzmann's constant. The mass flowrate $G = \rho Q$ can be obtained by multiplying equation (15) by equation (14) times a to get:

$$G = \gamma PA \frac{1 - 4f^2 \Delta t^2}{L} \Delta t \quad (17)$$

All of the quantities on the right side of these equations can either be easily measured or looked up in readily available handbooks.

The mass flowrate sensitivity may be calculated for air flow in a 5 cm diameter pipe by inserting $\gamma=1.378$, $L=30.5$ cm, and $P=101,325$ Pa into equation (17) to get $\Delta t=1.07$ $\mu$s for 1 g/s flowrate. We arbitrarily choose to specify as the full scale flowrate that flowrate for which the average Mach number is 1/10. We do this because equation (14) is linear within 1% up to Mach 1/10. Also, up to that value, the velocity v used in the above equations will, within 1%, equal the average of the gas velocity over the cross section of the conduit. This is proved in the 1977 *Journal of the Acoustical Society of America* paper by Robertson entitled "Effect of Arbitrary Temperature and Flow Profiles on the Speed of Sound in a Pipe", Vol. 62, pp. 813–818 (1977). Still, the instrument will operate on flows with a Mach number nearly as large as 1 and give measured values as described by the above equations. With the above definition, equations (12) and (8) give $\Delta t=88.2$ $\mu$s or or 82.4 g/s full scale at 20° C.

One percent resolution over a 10 to 1 mass flowrate range requires an 88 ns resolution in $\Delta t$. This requires that the two receiving means or microphones have a relative time delay (or phase shift) that is smaller than 88 ns. As seen in equation (19) in the 1977 *Review of Scientific Instruments* paper by Robertson and Potzick entitled "Synchronous Marker for Measuring Phase in the Presence of Noise", Vol. 48, pp. 1290–1294 (1977), this is aided by using microphones having a bandwidth at least $1/(2\pi 88 \text{ ns})=200$ kHz. This requirement can be relaxed somewhat if the phase shifts of the two microphones are very nearly equal.

Two types of sensors have been used for receiving means: a high quality $\frac{1}{8}$ inch condenser microphone and a wide band quartz pressure transducer. Both have a band width of about 200 kHz. Even though the condenser microphone has approximately 100 times more sensitivity than the quartz transducer, they seem to work approximately equally well. The quartz transducer used is Model 112A23 manufactured by PCB Piezotronics, P.O. Box 33, Buffalo, N.Y. 14225. It has a noise level of 100 $\mu$V and a sensitivity of 50 mV/psi with a 2 $\mu$s rise time. THe actual noise level for the particular transducers used is insignificant compared to the acoustic noise of a flowing gas, and so less expensive transducers with a higher noise level could be used.

The microphones are optionally mounted such that they minimally disturb the smoothness of the inside of the meter conduit in order to least affect the flow. In some embodiments, a rubber sleeve has been fitted over the microphone and the sleeved microphone simply plugged into a slightly tapered hole in the meter conduit much like a cork into a bottle. System adjustments are usually not necessary after removing and replacing a microphone mounted in this way. However, care must be taken to ensure that the mounting is air tight in order to prevent leakage and erroneous measurements.

Experiment has shown that high-pass filters at the microphone outputs with a cutoff frequency of about 100 Hz or 20% of f help reduce fluctuations in the mass flow indication due to low frequency noise, which is especially large at high gas temperatures. These filters may be just single pole filters, but they must be carefully matched in phase shift in order to avoid introducing a frequency-dependent error in the measurement of t as described by equation (19) of the above-mentioned 1977 *Review of Scientific Instruments* paper. This is important because, in view of the relation between the gas temperature and the correct operating frequency (as shown in equation (16)), such as error would lead to a temperature dependent offset in the flow indication.

In order for the instrument to be able to operate on a very noisy flow, the signals from the microphones must be filtered by extremely high-Q filters. These filters must not introduce a relative time delay as large as 88 ns even though the signal frequency changes over a broad range. Since the signal used to generate the sound wave can be used also as a reference, this filtering is best accomplished using a synchronous technique. A synchronous phase marker and amplitude detector (SPMAD) circuit as shown in FIG. 3 that meets these requirements is described in the 1981 *Review of Scientific Instruments* paper by Potzick and Robertson entitled "Voltage-Controlled Phase Shifter for Measuring Transfer Function in the Presence of Noise", Vol. 52, pp. 280–286 (1981). This circuit offers in effect an extremely high Q and in principle causes no phase shift. It provides a clean square wave output that accurately marks the phase of a sinusoidal signal that may be buried in noise by a large factor. The performance of a portion of this circuit is described in the 1977 *Review of Scientific Instruments* paper noted earlier. The same circuit also provides a voltage output that is proportional to the amplitude of the sine wave. Four of these circuits are used in the analog embodiment of the electronics for the present invention, on SPMAD for each microphone and each frequency.

In the FIG. 3 block diagram, the analog phase output voltage $v_\phi$ is fed back to the voltage-controlled phase shifter 30 causing it to shift the phase of the square wave $\mu(\omega t-\phi-\pi/2)$ until it is in quadrature with the signal that is obscured by the noise. The phase control voltage $v_\phi$ is obtained by integrating the product of the signal (plus noise), after amplification in wideband amplifier 28, and the shifted square wave $\mu(\omega t-\phi-\pi/2)$. This product appears at the output of the upper chopper 32 (sometimes referred to as a synchronous converter). That output averages to zero when the shifted square wave is in quadrature with the signal so that $v_\phi$ remains constant. This phase shifter 30 also has a second square wave output $\mu(\omega t-\phi)$, which is in quadrature with the first output. The desired time delay can be obtained by time-interval averaging measurements to the leading edges of the second square wave $\mu(\omega t-\phi)$. The amplitude output is obtained by multiplying the signal (plus noise) by the second shifted square wave $\mu(\omega t-\phi)$ in the lower chopper 34 and passing the result through a low pass amplifier 36.

Increasing the time constant of the integrator 38 (or decreasing the gain in the rest of the loop) decreases the time jitter in the phase marker output $\phi$ while it slows the response time of that output as described in the 1977 *Review of Scientific Instruments* article. Narrowing the bandwidth of the low pass amplitude amplifier decreases the noise at the amplitude output while also slowing its response time. Thus, the noise on the amplitude A and phase $\phi$ outputs can be decreased as much as desired, at the expense of increased response time, so that the transfer function of a two-port system can be accurately measured even in the presence of noise much larger than the signal.

In order to avoid phase shift errors, it is often best to use two of the synchronous phase marker and amplitude detector circuits, one to determine the amplitude and phase of the signal applied to the input port, and one for the signal observed at the output port. This is desirable in the long wavelength acoustic flowmeter where, because of temperature nonuniformity, there is an uncontrollable amplitude and phase change between the loudspeaker and the system being measured. To avoid this problem, two microphones and two marker/detector circuits are used, one measuring the input to the two-port system and one measuring the response at the output. The transfer function is then given by the ratio of amplitudes obtained from the two amplitude outputs and by the phase difference measured by time-interval averaging between the leading edges of the two phase marker outputs.

Figure 4:
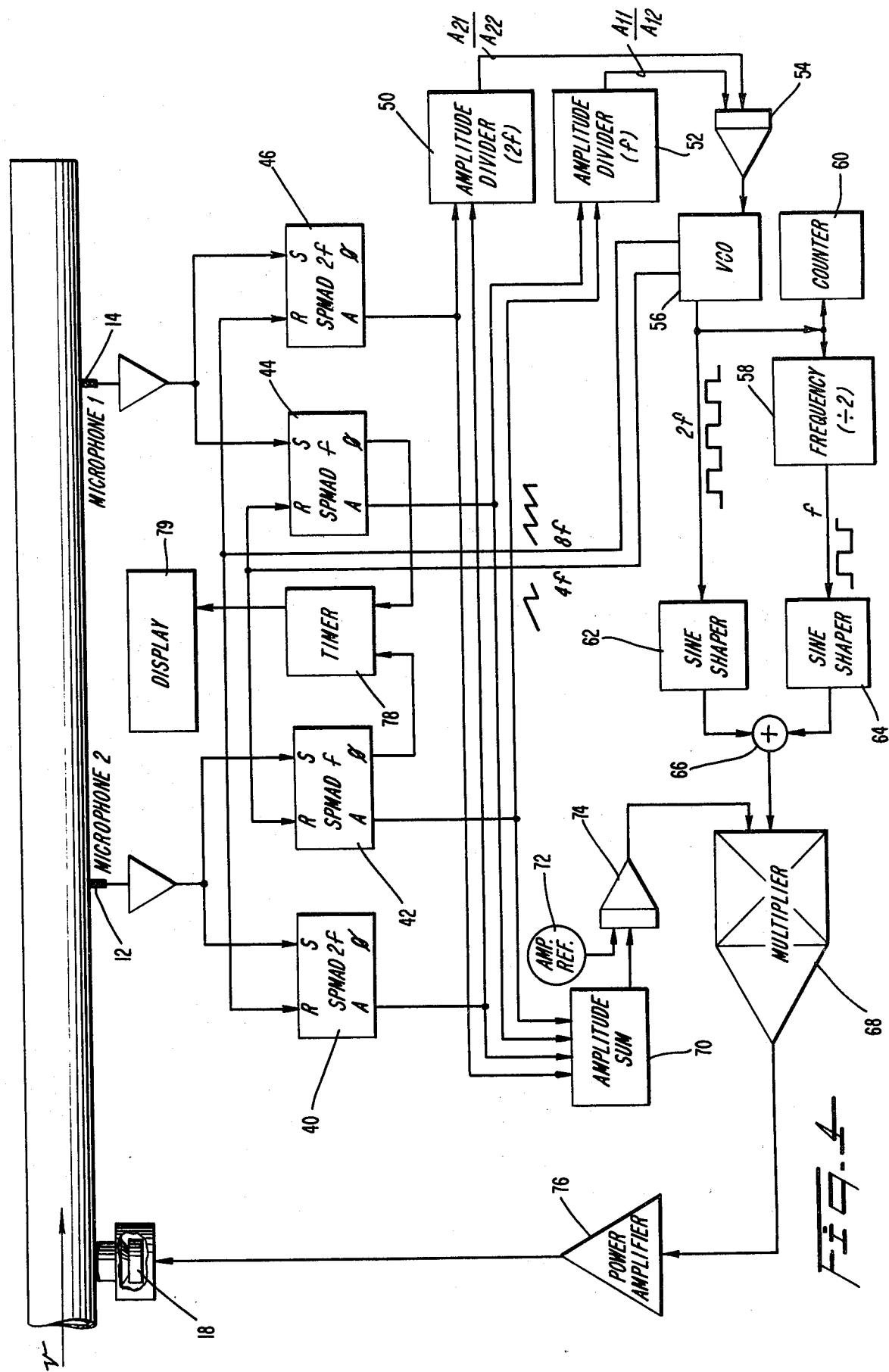
FIG. 4 is a block diagram of the electronic circuit used in an analog embodiment of the present invention.

The block diagram of this analog embodiment of the acoustic flowmeter is shown in FIG. 4. The outputs of microphones 1 and 2 are amplified and applied to the signal inputs of the SPMAD's 44 and 46, and 40 and 42, respectively. The amplitude outputs from SPMAD's 46 and 40, representing the amplitude at frequency 2f from microphones 1 and 2, are connected to the inputs of the 2f amplitude divider 50. The output of this divider is the ratio $A_{12}/A_{22}$.

Similarly, the amplitude outputs from SPMAD's 44 and 42 are connected to the amplitude divider 52 for frequency f. The output of this divider is the ratio $A_{11}/A_{21}$. The difference between these ratios is integrated by the integrator 54 and fed to the voltage-controlled oscillator (VCO) 56 to keep the frequency at the correct operating point given by equation (8). The 2f square wave output of the VCO 56 is connected to a frequency divider 58, with an 8f ramp output to the reference inputs of the SPMAD's 40 and 46. The 2f square wave may also be connected to a frequency or period counter 60, whose indication may be used for obtaining the average temperature from equation (16). The 4f ramp output of the VCO 56 is connected to the reference inputs of the SPMAD's 42 and 44. The 2f square wave output of the VCO 56 and the f square wave output of the frequency divider 58 are also connected to the sine shapers 62 and 64. Each sine shaper removes the DC level from the input TTL square wave, integrates the result to get a symmetric triangle wave, integrates the latter to get a symmetric parabolic wave, and band-pass filters the parabolic wave to get a sine wave. Since the amplitude of this sine wave would otherwise depend strongly on frequency, the sine shapers have a feedback controlled gain that maintains constant output amplitude. The sine shaper outputs are combined in the adder 66 and supplied as one input to the multiplier 68 that is used for control of the sound amplitude.

The amplitude outputs of the SPMAD's 40 through 46 are also connected to an amplitude summer 70, which computes an average amplitude to be compared with the amplitude reference 72. This comparison is done in the differential integrator 74, whose output is connected to one input of the multiplier 68 used for amplitude control. The output of this amplitude multiplier 68 is connected to the power amplifier 76, which drives the loudspeaker 18. Thus, the sine shapers 62 and 64 and the adder 66 supply the signal that is a superposition of sine waves at frequencies f and 2f. The amplitudes of these sinusoids are controlled so that the amplitude dividers operate at typically 80% of full scale. The phase marker outputs $\phi$ from the SPMAD's 42 and 44 are compared in the time-interval averaging counter 78, which gives $\Delta t$ for use in equation (17) to obtain the mass flow rate.

The means for insuring that the spacing L is an integral multiple of a half wavelength of f in FIG. 4 is the amplitude outputs of SPMAD's 40, 42, 44 and 46, amplitude dividers 50 and 52, integrator 54, VCO 56, divider 58 and sine shapers 62 and 64. In FIG. 4, the means for measuring the phase difference comprises the SPMAD's 42 and 44 and the timer 78 and the means for indicating at least one parameter (in a preferred embodiment, mass flow rate) is display 79.

Figure 5:
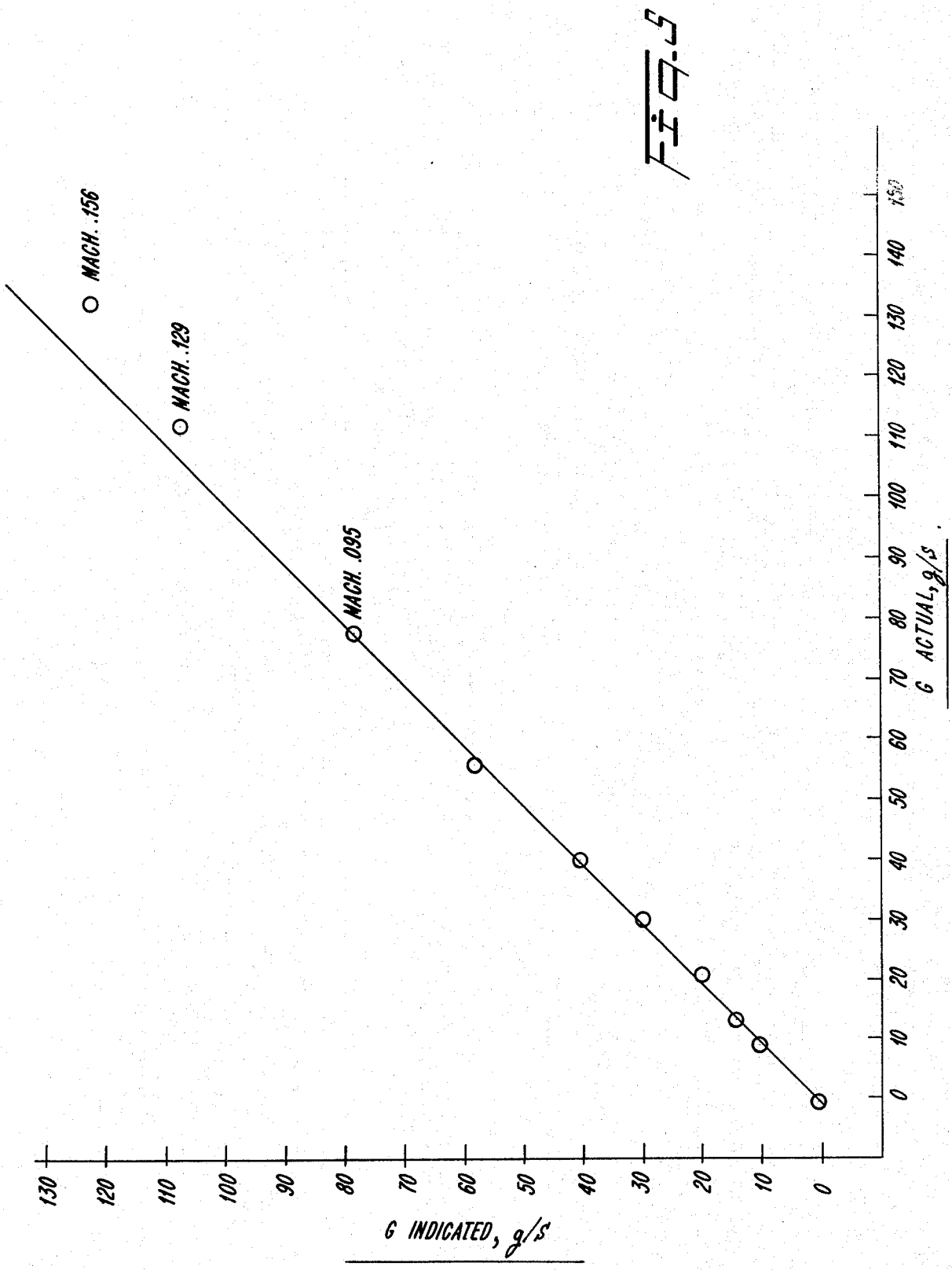
FIG. 5 is a graph of the mass flowrate indication of the analog embodiment of the present invention versus the actual mass flowrate.

The meter-tube embodiment of FIG. 1 with the analog-electronics embodiment of FIG. 4 was tested on the National Bureau of Standards (NBS) air flow calibration facilities. The results are shown in FIG. 5. Here, the actual mass flowrate G actual was measured using NBS transfer-standard sonic nozzles. The indicated mass flowrate G indicated was calculated from equation (17) using measured and handbook values for the quantities on the right. The straight line is the result of a least squares fit to the data below full scale at Mach 1/10. The slope of this line is within 0.1 percent of the expected value of 1, but there was an offset of 0.681 g/s, which is about 8% of full scale and 0.8% of Mach 1. The two data points above Mach 0.1 fell below the line, most likely because of a temperature dependence to the offset. The temperature of the air flow decreased from room temperature at the lower flowrates to 0° C. at the highest flowrate.

The temperature dependent offset in the flow indication has been observed directly in a number of tests, in which the flowing air was heated up to 130° C. while the actual mass flowrate was held constant. The offset was less than 10% of full scale and depended on temperature history. Some of this offset was shown to be associated with the microphones themselves by interchanging them with each other and with spares. Part of the flow indication offset that is associated with the microphones may be due to a strong temperature dependence of the resistance of the quartz transducer itself, and part may be due to the follower amplifier attached to the transducer. At room temperature, the quartz transducer with its attached MOSFET amplifier, insulating potting, and teflon insulation have a resistance of about 50,000 megohms and a capacitance of about 20 pf. This gives a 1 second time constant and, according to equation (19) of the 1977 *Review of Scientific Instruments* paper, a time shift of 80 ns at 563 Hz. At 100° C., the resistance of the quartz will be about a factor of 5 lower, so the time constant will be 1/5 second or shorter. The resulting time shift will increase to approximately 400 ns or more at the operating frequency. Since this time shift leads to an offset in the flow indication, this explained some of the observed temperature dependent offset.

The time shift cannot be eliminated by using a filter to narrow the bandwidth, e.g., by using the previously mentioned high-pass filter with a 100 Hz corner. This follows since the phase shifts due to cascaded filters are additive even if their corner frequencies are widely separated. One possibility of correcting this time shift is to use an amplifier with 200 pf capacitance to decrease the phase shift. The amplifier can also be separated from the transducer so that the amplifier will remain at room temperature.

Figure 6:
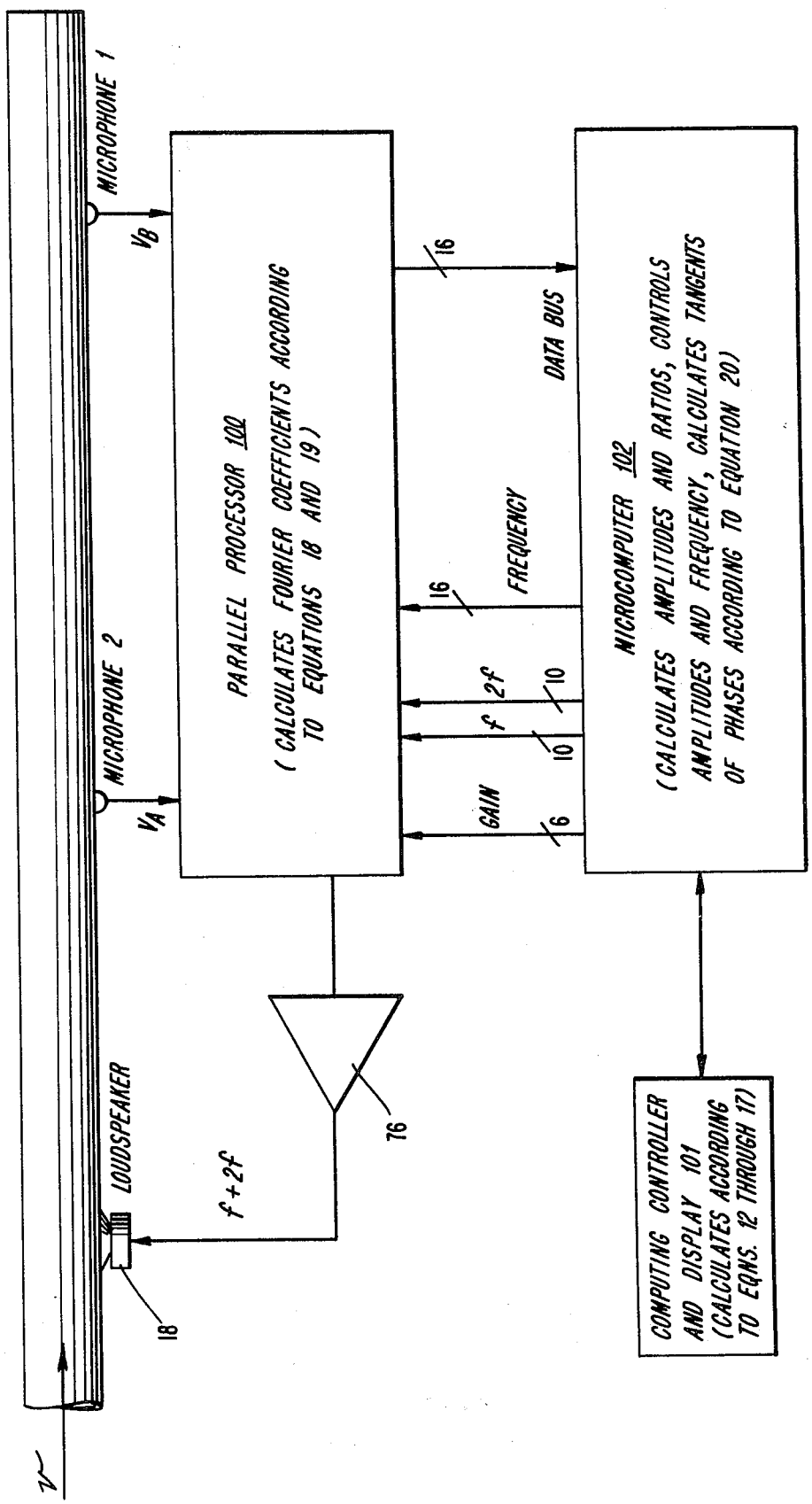
FIG. 6 is a functional block diagram of a digital embodiment of the acoustic flowmeter in accordance with the present invention.

Another possible cause for flow indication offset, although not associated with the temperature of the flowing gas, is some drifting in the analog circuitry. This decreases the repeatability of the flow indication, especially when the instrument is first turned on. A digital embodiment of the electronics has been designed in an effort to reduce this drifting. This embodiment, as shown in the FIG. 6 block diagram, comprises a parallel processor 100 and a microcomputer 102 programmed in ROM and connected to a computing controller and display 101 for computation and display. The parallel processor 100 is a specially designed high-speed processor that is desirable because part of the processing must be done at a much greater speed than is presently possible with a microcomputer alone. The microcomputer 102 is used in order to simplify development of the remainder of the processing, which does not need particularly high speed, and to retain flexibility for making minor design changes.

The parallel processor simultaneously computes eight Fourier coefficients of the sound signal, one sine and one cosine coefficient for each microphone and each frequency. If we revert for the moment to the single frequency description used previously, the signal from the microphone at location x is given as before by equation (4). The Fourier coefficients then are given by:

$$C(x) = \frac{1}{\pi} \int_0^{2\pi} V \cos(\omega t) \, d(\omega t) = A(x) \cos\phi(x) \quad (18)$$

$$S(x) = \frac{-1}{\pi} \int_0^{2\pi} V \sin(\omega t) \, d(\omega t) = A(x) \sin\phi(x) \quad (19)$$

The computation of these Fourier coefficients discriminates effectively against all of the harmonics of the frequency $\omega/2\pi$ as well as against broadband noise. This has an important advantage in comparison with the SPMAD's, which discriminate only against the even harmonics, although the SPMAD's do discriminate effectively against nonharmonic pure tones and broadband noise.

The values of the Fourier coefficients are fed to the microcomputer on interrupt every acoustic period, which is in the range from 1.8 to 1.4 ms depending on the frequency (which is a function of the temperature). The microcomputer uses the coefficients to compute the squares of the amplitudes of the four sine waves, one for each microphone and each frequency, and uses the squares of the amplitudes to set the sound level at each frequency. It computes the difference between the squares of the ratio (equation (7)) for frequencies f and 2f. This is approximately twice the error signal in equation (9), as described previously. The microcomputer uses this difference, summed over many sound periods, to set the frequency to the operating point. When the frequency is set correctly, the microcomputer computes the tangent of the phase difference at each frequency. Once again let subscripts denote the downstream and upstream microphones and the frequencies f and 2f, respectively. Trigonometric identities can be used to express the phase difference in terms of the Fourier coefficients as:

$$\tan(\Delta\phi_i) = \frac{C_{2i}S_{1i} - S_{2i}C_{1i}}{C_{2i}C_{1i} + S_{2i}S_{1i}}, \, i = 1, 2 \quad (20)$$

The microcomputer uses this expression to compute the tangent of the phase once every acoustic period.

In a preferred embodiment, the instrument contains an arctangent lookup table in read-only memory (ROM) so that the microcomputer can average the phase itself rather than the tangent of the phase. This adds considerable expense but offers increased accuracy for flow velocities with large fluctuations and Mach numbers larger than 1/10. Alternatively, the microcomputer could compute the arctangent, but for presently available hardware, this would take too much time, and data would have to be ignored in order to average the phase rather than its tangent. The reduced ability to discriminate against noise while performing real-time measurements makes this alternative less desirable. For Mach numbers less than the full scale 1/10, the distinction between the phase and its tangent is less important, especially for reasonably steady flows. Thus, in one embodiment, the microcomputer averages the tangent of the phase and transmits it to the computing controller and display 101 for computation and display of the resulting flowrates.

A block diagram of a preferred embodiment of the parallel processor is shown in FIG. 7. The parallel processor 100 has a clock 125 whose frequency is controlled by an input from the microcomputer to operate at 256 times the operating frequency f. The clock pulses are counted by the counter 126 to obtain an 8-bit up-ramp or sawtooth wave. This sawtooth output is connected to the 8-bit address inputs of the ROM's 121 through 124, which contain one or two cycles of the cosine or sine functions, accurate to 8 bits. The 8-bit data outputs of these ROM's are 127 cos $(2\pi 2n/256)$, 127 sin $(2\pi 2n/256)$, 127 cos $(2\pi n/256)$, and 127 sin $(2\pi n/256)$, respectively, rounded to the nearest integer, where n is an integer that is incremented by 1 at a rate 256 times f. These data outputs are connected to one input of the multiplier/accumulators 111 through 114 and also 115 through 118, respectively. The sine 2f and sin f outputs of ROM's 122 and 124, respectively, are also connected to the 8-bit digital-to-analog converters (DAC's) 130 and 133, respectively. The approximately sinusoidal voltage outputs at frequencies 2f and f of these DAC's are filtered to remove the 256 steps and then connected to the inputs of the multiplying digital-to-analog converters (MDAC's) 134 and 136, respectively. These MDAC's multiply the sinusoids by a voltage specified by the 10-bit input to the DMAC's, and the resulting output is a sinusoid whose amplitude is proportional to that factor. This 10-bit digital input is supplied by the microcomputer to maintain the sound amplitude for each frequency at a preset level. The two sinusoidal voltages are added in the summer 138 and their sum is amplified in the amplifier 146 and the power amplifier 76 and supplied to the loudspeaker 18 as in the analog embodiment.

The resulting signals from the microphones 1 and 2 are amplified by the amplifiers 103 and 105. Both these amplifiers and the amplifier 146 have their gains controlled by the microcomputer over the range from 1 to 128 in powers of 2. The digital input to the amplifier 146 is wired inversely to the digital inputs to the amplifiers 103 and 105 so that, when the sound level is increased by a factor of 2, the microphone gain will simultaneously be decreased by a factor of 2, and the signal level at the output of the amplifiers 103 and 105 will remain constant. Since increasing the sound level increases the signal-to-noise ratio, this digital input is, in effect, a signal-to-noise control.

The signals from the amplifiers 103 and 105 are converted to 8-bit digital amplitudes at a rate equal to 256 f in the analog-to-digital converters (ADC's) 104 and 106, respectively. The 8-bit outputs of these ADC's are connected to one of the inputs of the multiplier/accumulators 111 through 114 and 115 through 118, respectively. The multiplier/accumulators used in the preferred embodiment are TRW 1009J 12-bit by 12-bit multipliers with 27-bit accumulators and tristate outputs and are available from TRW LSI Products Division of TRW, Inc., P. O. Box 1125, Redondo Beach, CA 90278. The accumulators are set to zero at the start of an acoustic period. The Fourier coefficients are available at the outputs of the accumulators at the end of the acoustic period. The 16 most significant bits of these outputs are fed to the microcomputer on its 16-bit data bus, on non-vectored interrupt, at the end of the period. Detailed wiring for the interrupt generation, the data register addressing, and the triggering of the ADC's, the DAC's, the multipliers, the registers, and the accumulator and counter resetting has been omitted from FIG. 5 for clarity. These details are easily supplied by one of ordinary skill in the art.

The microcomputer used must be able to carry out 16-bit multiplications and divisions sufficiently rapidly that all the indicated computations can be completed in the approximately 1.4 ms minimum period of the fundamental sound wave and have enough time left over to handle data I/O and other overhead tasks. This is required so that no available data will be lost and the time averages will include the largest possible number of terms in the shortest time. This makes the instrument better able to discriminate against high-level noise and compute the average of measured quantities that may have relatively large random fluctuations and yet be able to output the measured values in almost real time. The microcomputer used in a preferred embodiment is the AmZ8000 Evaluation Board manufactured by Advanced Micro Computor Devices at 901 Thompson Place, Sunnyvale, CA 94086. Since a RS232C cable is used to connect this microcomputer to its console, any dumb terminal or, alternatively, another computer, if suitably programmed, can be used for control of the flowmeter and display of its output. an For either the analog or digital embodiment, the response time of the instrument to a step change in flowrate or temperature is ultimately limited by the transit time of the step between the two receivers and by the sampling rate, which is once per acoustic period. For the dimensions used in the embodiment of FIG. 1, both are about one millisecond. Another possible limitation is the response time of the narrowbanding SPMAD's in the analog embodiment or the averaging in the digital embodiment that discriminates against noise. Another limitation is the response time of the feedback loop that adjusts the frequency to satisfy the condition of equation (8) and of the loop that controls the amplitude of the sound. For flows associated with a high noise level, the response time of the whole instrument will be made greater than the above minimum by the narrow banding, the averaging, or the loops.

As has been noted earlier, the generator of sound at a specified wavelength may be desirable in applications other than the acoustic flowmeter discussed here. Furthermore, the synchronous phase marker and amplitude detector may be useful in applications other than the acoustic flowmeter where it is desirable to measure the phase and amplitude of a signal which is obscured by high noise levels. The acoustic flowmeter does not necessarily have to have a specific wavelength sound generator and, instead, could adjust the receiver means spacing in order to maintain their spacing equal to an integral multiple of half wavelengths of whatever frequency is generated. The analog embodiment feedback to the VCO could just as easily be utilized to control the microphone spacing by moving two telescoping tubes relative to each other, each tube having one microphone therein.

Although the invention has been described relative to specific embodiments thereof, it is not so limited. Many modifications and variations will be readily apparent to those skilled in the art in the light of the foregoing disclosure, and the invention may be practiced otherwise than has been specifically described. Embodiments of the invention in which an exclusive property or privilege is claimed are defined as follows:

Appendix B
GLOSSARY OF TERMS $a$ = cross-sectional area of conduit
$A$ = amplitude of acoustic signal
$A_u$ & $A_d$ = amplitude upstream and downstream, respectively
$c$ = speed of sound in fluid
$D$ = distance of first microphone from conduit end
$f$ = frequency
$f'$ = fundamental frequency
$G$ = mass flowrate
$K$ = Boltzmann's constant
$l$ = bend correction (distance from effective to actual end of pipe)
$L$ = microphone spacing
$m$ = average mass of a gas molecule
$M$ = average Mach number of flowing fluid
$P$ = absolute pressure inside conduit
$Pa$ = unit of pressure (Pascal)
$Q$ = average volume flowrate
$R$ = magnitude of reflection coefficient
$T$ = temperature of gas
$v$ = average velocity of flowing fluid
$x$ = position in direction of propagation with respect to conduit end
$\Delta t$ = time difference
$\Delta \phi$ = phase difference
$\epsilon$ = error signal
$\gamma$ = ratio of specific heats
$\phi$ = phase of acoustic signal with respect to reference signal
$\phi_d$ = downstream phase
$\phi_u$ = upstream phase
$\rho$ = gas density
$\omega$ = angular frequency

What is claimed is:

1. An acoustical flowmeter for measuring at least one parameter of a moving fluid, said flowmeter comprising:
    means for producing substantially planar acoustic waves at a distance having a wavelength $\lambda$;
    first means for receiving said acoustic waves, said first means located apart from said producing means at said distance at least in a direction parallel to said direction of movement of said moving fluid,
    second means, spaced apart from said first means at least in a direction parallel to a direction of movement of said moving fluid, for receiving said acoustic waves;
    means for insuring that the spacing between said first and second means in said direction parallel to said direction of movement of said moving fluid, is a spacing equal to $m\lambda/2$, where m is any integer;
    means for measuring phase difference between acoustic waves received at said first and second means; and
    means, responsive to said phase difference measuring means, for indicating said at least one parameter.

2. The coustical flowmeter according to claim 1, wherein said insuring means comprises means for changing the frequency of said acoustic waves from said producing means such that the spacing between said first and second means is equal to mλ/2.

3. The acoustical flowmeter according to claim 2, wherein said producing means comprises:
conduit means through which said moving fluid flows;
signal generator means, responsive to said insuring means, for generating an electrical signal of frequency f; and
loudspeaker means, mounted on the side of said conduit and responsive to said signal generator means, for injecting acoustic waves into said conduit, said acoustic waves having a frequency equal to f where λ equals c/f, where c equals the speed of sound in said fluid.

4. The acoustical flowmeter according to claim 3, wherein said insuring means comprises:
means, responsive to said first and second receiving means, for comparing the amplitude of received acoustic waves and for providing an output to said frequency changing means when said amplitudes are not equal.

5. The acoustic flowmeter according to claim 3, wherein said frequency changing means comprises:
means for providing an output indicative of the ratio of amplitudes of signals received at said first and second receiving means;
means, responsive to said ratio indicative output, for comparing said ratio indicative output with a preset number and providing an output indicative of said comparison; and
means, responsive to said comparison output, for generating an input signal for said producing means at a frequency which has a wavelength λ in said fluid where mλ/2 is equal to said distance when m equals any integer.

6. The acoustical flowmeter according to claims 1 or 4, wherein said insuring means is responsive to Fourier coefficients from said first and second receiving means, and wherein said first and second receiving means each comprises:
microphone means for converting said acoustic waves into electronic signals; and
means for computing the Fourier coefficients for said electronic signals.

7. The acoustical flowmeter according to claim 3 or 4, wherein said signal generator comprises:
a voltage controlled oscillator, responsive to the output of said insuring means, for generating a signal f; and
a power amplifier, responsive to said signal f, for powering said loudspeaker means.

8. The acoustical flowmeter according to one of claims 3 or 4, wherein said measuring means comprises:
a first synchronous phase marker and amplitude detector (SPMAD), responsive to the received acoustic wave of said first receiving means and to said electrical signal f, for providing phase and amplitude outputs;
a second synchronous phase marker and amplitude detector (SPMAD), responsive to the received acoustic wave of said second receiving means and to said electrical signal f, for providing phase and amplitude outputs; and
means for determining the phase difference between phase outputs of said first and second phase and amplitude detectors.

9. The acoustic flowmeter according to claim 1, wherein said insuring means comprises:
means, responsive to said first and second receiving means, for comparing the amplitudes of received acoustic waves, said comparing means providing a comparison output indicative of said comparison; and
means, responsive to said comparison output, for generating an input signal for said producing means at a frequency which has a wavelength λ in said fluid where mλ/2 is equal to said distance when n equals any integer.

10. An acoustical flowmeter for measuring at least one parameter of a moving fluid, said flowmeter comprising:
conduit means having a cutoff wavelength through which the moving fluid flows;
signal generator means for generating electrical signals of frequencies f and 2f;
loudspeaker means, mounted on a side of said conduit and responsive to said signal generator means, for producing acoustic waves with a wavelength λ which is longer than said cutoff wavelength, said waves further moving parallel with said moving fluid, where λ=c/f with c equal to the speed of sound in said fluid;
first means, at least partially located along the line from said loudspeaker means substantially parallel with said direction of movement of said moving fluid, for receiving said acoustic waves and converting said acoustic waves into electrical signals having an amplitude and a phase;
second means spaced apart from said first means and at least partially located substantially along the line connecting said loudspeaker means and said first means, for receiving said acoustic waves and converting said acoustic waves into an electric signal having an amplitude and a phase;
means for insuring that mλ/2 is equal to the spacing between said first and second means, where m is any integer;
means for measuring any difference in phase between said electric signals generated by said first and second receiving means; and
means, responsive to said phase measuring means, for indicating said at least one parameter.

11. The acoustical flowmeter according to claim 10, wherein said signal generator means comprises:
variable oscillator means for producing an electrical signal with a frequency 2f;
frequency divider means, responsive to said oscillator means, for providing an electrical signal with a frequency of f;
first means, responsive to said signal of frequency f, for shaping said signal into a sinewave of frequency f;
a second means, responsive to said signal of frequency 2f, for shaping said signal into a sinewave of frequency 2f;
means, responsive to said first and second shaping means, for adding together said sinewave signals of frequencies f and 2f, and providing an output of said added together signal; and
amplifier means for controllably amplifying said adding means output and powering said loudspeaker.

12. The acoustical flowmeter according to claim 11, wherein said amplifier means comprises:
means for generating an amplitude reference signal;

means for summing the amplitude signals from said first and second receiving means;

means for comparing the sum of amplitude signals from said first and second means with the amplitude reference signal, said comparing means providing a control output based upon said comparison; and means, responsive to said control output of said comparing means, for variably amplifying said adding means output and powering said loudspeaker.

13. The acoustical flowmeter according to claim 12, wherein said first and second receiving means each comprise:

a microphone mounted in the wall of said tube means;

a first synchronous phase marker and amplitude detector (SPMAD), having a signal input connected to said microphone and a reference signal input connected to said electrical signal with a frequency f, and amplitude and phase outputs;

a second synchronous phase marker and amplitude detector (SPMAD) having a signal input connected to said microphone and a reference signal input connected to said electrical signal having a frequency 2f, and amplitude and phase outputs.

14. The acoustical flowmeter according to claim 13, wherein said insuring means comprises:

a first means, responsive to the synchronous phase marker and amplitude detectors of said receiving means, having a reference signal of frequency f, for dividing the amplitude output of said first receiving means synchronous phase marker and amplitude detector by the amplitude output of said second receiving means synchronous phase marker and amplitude detector, and providing the output ratio $A_{11}/A_{12}$;

a second means, responsive to the synchronous phase marker and amplitude detectors of said receiving means, having a reference signal of frequency 2f for dividing the amplitude output of said first receiving means synchronous phase marker and amplitude detector by the amplitude output of said second receiving means synchronous phase marker and amplitude detector, and providing the output ratio $A_{21}/A_{22}$; and means for comparing said ratio $A_{11}/A_{12}$ with said ratio $A_{21}/A_{22}$, for varying the frequency 2f of said variable oscillator means and for maintaining said ratios equal.

15. A method for measuring at least one parameter of a moving fluid comprising the steps of:

producing substantially planar acoustic waves at a distance having a wavelength $\lambda$, said distance in a direction parallel to the direction of movement of said moving fluid;

receiving said acoustic waves at at least two points, said first point located along a line from said source substantially parallel with said direction of movement of said moving fluid and said second point located along a line connecting said source and said first point;

maintaining $m\lambda/2$, equal to the spacing between said first and second points, where m is any integer;

measuring the phase difference between acoustic waves at said first and second points; and responsive to said measuring step, indicating at least said one parameter of said moving fluid.

16. An instrument for producing sound waves of a specified wavelength in an arbitrary fluid in a conduit having a cutoff wavelength, said instrument comprising:

means, responsive to an input signal, for producing sound waves in said fluid of at least one wavelength, said at least one wavelength being longer than said cutoff wavelength of said conduit;

first means for receiving said sound waves;

second means for receiving said sound waves, said second receiving means located a distance, in a direction of sound propagation, from said first receiving means;

means, responsive to said first and second receiving means, for producing said input signal of a frequency such that said distance is an integral number of half wavelengths of said specified wavelength, wherein said input signal producing means includes means, responsive to said first and second receiving means, for controlling the average amplitude of sound waves from said sound wave producing means.

17. An instrument for producing sound waves of a specified wavelength in an arbitrary fluid in a conduit having a cutoff wavelength, said instrument comprising:

means, responsive to an input signal, for producing sound waves in said fluid of at least one wavelength, said at least one wavelength being longer than said cutoff wavelength of said conduit;

first means for receiving said sound waves;

second means for receiving said sound waves, said second receiving means located a distance, in a direction of sound propagation, from said first receiving means;

means, responsive to said first and second receiving means, for producing said input signal of a frequency such that said distance is an integral number of half wavelengths of said specified wavelength; wherein said input signal producing means comprises:

means, responsive to said first and second receiving means, for comparing the amplitudes of received sound waves, said comparing means providing a comparison output indicative of said comparison; and means, responsive to said comparison output, for generating an input signal at a frequency which has a wavelength $\lambda$ in said fluid where $m\lambda/2$ is equal to said distance when m equals any integer.

18. An instrument for producing sound waves of a specified wavelength in an arbitrary fluid in a conduit having a cutoff wavelength, said instrument comprising:

means, responsive to an input signal, for producing sound waves in said fluid of at least one wavelength, said at least one wavelength being longer than said cutoff wavelength of said conduit;

first means for receiving said sound waves;

second means for receiving said sound waves, said second receiving means located a distance, in a direction of sound propagation, from said first receiving means;

means, responsive to said first and second receiving means, for producing said input signal of a frequency such that said distance is an integral number of half wavelengths of said specified wavelength, wherein said input signal producing means comprises:

means for providing an output indicative of the ratio of amplitudes of signals received at said first and second receiving means;

means, responsive to said ratio indicative output, for comparing said ratio indicative output with a preset number and providing an output indicative of said comparison; and means, responsive to said comparison output, for generating an input signal at a frequency which has a wavelength λ in said fluid where mλ/2 is equal to said distance when m equals any integer.

19. An instrument for producing sound waves of a specified wavelength in an arbitrary fluid in a conduit having a cutoff wavelength, said instrument comprising:

means, responsive to an input signal, for producing sound waves in said fluid of at least one wavelength, said at least one wavelength being longer than said cutoff wavelength of said conduit;

first means for receiving said sound waves;

second means for receiving said sound waves, said second receiving means located a distance, in a direction of sound propagation, from said first receiving means;

means, responsive to said first and second receiving means, for producing said input signal of a frequency such that said distance is an integral number of half wavelengths of said specified wavelength, wherein said sound wave producing means provides sound waves of at least two frequencies, one frequency equal to twice the other, and said input signal producing means comprises:

means for providing a first output indicative of the ratio of amplitudes of said one frequency received at said first and second receiving means;

means for providing a second output indicative of the ratio of amplitudes of said other frequency received at said first and second receiving means;

means for comparing said first and second outputs and for providing an amplitude ratio comparison output;

and means, responsive to said amplitude ratio comparison output, for generating an input signal at a frequency which has a wavelength λ in said fluid where mλ/2 is equal to said distance when m equals any integer.

20. An instrument for producing sound waves of a specified wavelength in an arbitrary fluid in a conduit having a cutoff wavelength, said instrument comprising:

means, responsive to an input signal, for producing sound waves in said fluid of at least one wavelength, said at least one wavelength being longer than said cutoff wavelength of said conduit;

first means for receiving said sound waves;

second means for receiving said sound waves, said second receiving means located a distance, in a direction of sound propagation, from said first receiving means;

means, responsive to said first and second receiving means, for producing said input signal of a frequency such that said distance is an integral number of half wavelengths of said specified wavelength, wherein said first and second receiving means each comprises:

microphone means for converting said sound waves into electronic signals;

a synchronous phase marker and amplitude detector (SPMAD), responsive to said electronic signals and a reference signal having phase and amplitude outputs; and wherein said input signal producing means is responsive to the amplitude outputs of the synchronous phase marker and amplitude detectors of each of said first and second receiving means.

21. An instrument for producing sound waves of a specified wavelength in an arbitrary fluid in a conduit having a cutoff wavelength, said instrument comprising:

means, responsive to an input signal, for producing sound waves in said fluid of at least one wavelength, said at least one wavelength being longer than said cutoff wavelength of said conduit;

first means for receiving said sound waves;

second means for receiving said sound waves, said second receiving means located a distance, in a direction of sound propagation, from said first receiving means;

means, responsive to said first and second receiving means, for producing said input signal of a frequency such that said distance is an integral number of half wavelengths of said specified wavelength, wherein said first and second receiving means each comprises:

microphone means for converting said sound waves into electronic signals;

means for computing the Fourier coefficients for said electronic signals and, wherein said input signal producing means is responsive to said Fourier coefficients from said first and second receiving means.

22. The instrument of claim 20 or 21 wherein said first and second receiving means comprise broadband microphones, each of said microphones mounted in said conduit such that said instrument is nonintrusive (backpressure is less than 500 Pascals).

* * * * *